United States Patent
Hasegawa et al.

(10) Patent No.: US 9,996,459 B2
(45) Date of Patent: Jun. 12, 2018

(54) RECLAIMING OF SEQUENTIAL STORAGE MEDIUM

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/859,827

(22) Filed: Sep. 21, 2015

(65) Prior Publication Data

US 2017/0083437 A1    Mar. 23, 2017

(51) Int. Cl.
*G06F 3/06* (2006.01)
*G06F 12/02* (2006.01)

(52) U.S. Cl.
CPC ........ *G06F 12/0253* (2013.01); *G06F 3/0619* (2013.01); *G06F 3/0647* (2013.01); *G06F 3/0683* (2013.01); *G06F 2212/1044* (2013.01)

(58) Field of Classification Search
CPC .... G06F 3/0619; G06F 3/0647; G06F 3/0683; G06F 12/0253; G06F 2212/1044
See application file for complete search history.

(56) References Cited

U.S. PATENT DOCUMENTS

| | | | |
|---|---|---|---|
| 8,341,346 B2 | 12/2012 | Ashton et al. | |
| 8,930,617 B2 | 1/2015 | Haustein et al. | |
| 9,009,443 B2 | 4/2015 | Haustein et al. | |
| 9,021,175 B2 | 4/2015 | Butt et al. | |
| 2004/0044854 A1* | 3/2004 | Gibble | G06F 3/0608 711/154 |
| 2011/0010495 A1* | 1/2011 | Haustein | G06F 3/0608 711/111 |
| 2012/0179868 A1* | 7/2012 | Haustein | G06F 12/0253 711/111 |
| 2014/0089275 A1 | 3/2014 | Akirav et al. | |
| 2015/0146317 A1 | 5/2015 | Abe et al. | |

OTHER PUBLICATIONS

"Tape Reclamation", Posted by: Hasnainshaer's Blog, Jul. 7, 2012, Printed on: Aug. 13, 2015, 4 pages, <https://hasnainshaer.wordpress.com/2012/07/07/tape-reclamation/>.

* cited by examiner

*Primary Examiner* — Aracelis Ruiz
(74) *Attorney, Agent, or Firm* — William H. Hartwell

(57) ABSTRACT

Software for reclaiming a sequential storage medium that includes: copying all active data blocks in a first part of sequentially written data on a first sequential storage medium, to a second sequential storage medium, the first part extending from a first intermediate position to an end of the sequentially written data; and defining all data blocks in a second part of the sequentially written data on the first sequential storage medium, to be a new sequentially written data, the second part extending from a beginning to a second intermediate position of the sequentially written data, and excluding the active data blocks copied to the second sequential storage medium.

15 Claims, 7 Drawing Sheets

RECLAIMING OF SEQUENTIAL STORAGE MEDIUM

BACKGROUND

The present invention relates to reclaiming a sequential storage medium.

SUMMARY

According to an embodiment of the present invention, there is provided a computer-implemented method, computer program product and/or system for reclaiming a sequential storage medium that performs the following operations (not necessarily in the following order: (i) copying all active data blocks in a first part of sequentially written data on a first sequential storage medium, to a second sequential storage medium, the first part extending from a first intermediate position to an end of the sequentially written data; and (ii) defining all data blocks in a second part of the sequentially written data on the first sequential storage medium, to be a new sequentially written data, the second part extending from a beginning to a second intermediate position of the sequentially written data, and excluding the active data blocks copied to the second sequential storage medium.

DETAILED DESCRIPTION

Hereinafter, example embodiments of the present invention will be described in detail with reference to the attached drawings.

It is to be noted that the present invention is not limited to these example embodiments to be given below and may be implemented with various modifications within the scope of the present invention. In addition, the drawings used herein are for purposes of illustration, and may not show actual dimensions.

Figure 1:
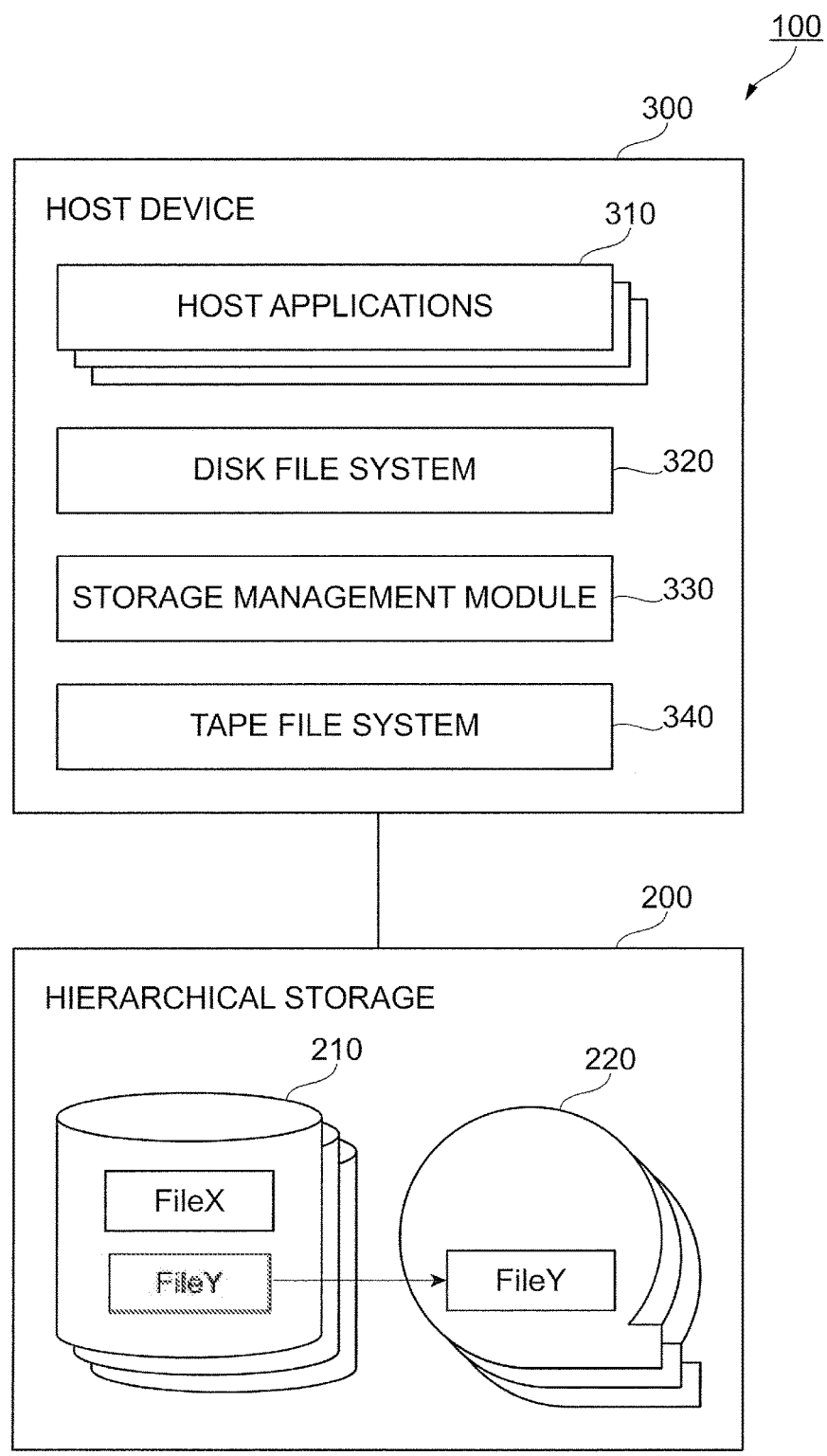
FIG. 1 depicts a block diagram of a hierarchical storage system according to example embodiments of the present invention.

Referring to FIG. 1, there is shown a block diagram of a hierarchical storage system 100 to which the example embodiments are applied. As shown in the figure, the hierarchical storage system 100 may include a hierarchical storage 200 and a host device 300.

The hierarchical storage 200 may include disk media 210 and tape media 220. The disk media 210 serve as primary storage media, and the tape media 220 serve as secondary storage media. The primary storage media can be accessed at a speed higher than the secondary storage media, and thus the primary storage media serve as one example of high-speed storage media. When a file is sent by the host device 300, the file is firstly stored in the disk medium 210, as indicated by the files "FileX" and "FileY" in the disk medium 210. The disk medium 210 may be included in a shared disk array. In response to a determination that the file is likely to be unused for a period of time, the file is stored in the tape medium 220 instead of the disk media 210, as indicated by the file "FileY" in the tape medium 220. The tape medium 220 may be included in a tape library (not shown). The tape library may include plural tape drives (not shown), and when accessed, the tape medium 220 may be mounted on any one of the plural tape drives. Note that, in the example embodiments, the disk media 210 such as magnetic disk media are used as the primary storage media, although other media such as solid-state media may be used. In the example embodiments, the tape media 220 such as magnetic tape media are used as one example of sequential storage media.

The host device 300 may include host applications 310, a disk file system 320, a storage management module 330, and a tape file system 340.

Each host application 310 may send, to the disk file system 320, a write request to write a file in the hierarchical storage system 100. Each host application 310 may send, to the disk file system 320, a read request to read a file from the hierarchical storage system 100, and may receive, from the disk file system 320, the file read from the hierarchical storage system 100.

The disk file system 320 is a software component which provides an interface for access to the disk media 210. The disk file system 320 may write a file to the disk medium 210 in response to a write request of the file from the host application 310. The disk file system 320 may return a file to the host application 310 in response to a read request of the file from the host application 310. Assuming that the disk media 210 include a shared disk array, the disk file system 320 may be, for example, the General Parallel File System (GPFS) (Note: the term "GPFS" may be subject to trademark rights in various jurisdictions throughout the world and are used here only in reference to the products or services properly denominated by the marks to the extent that such trademark rights may exist.).

The storage management module 330 is a software component which provides integration of the disk file system 320 with the tape file system 340. The storage management module 330 may manage migration and recall of files in the hierarchical storage system 100. That is, the storage management module 330 may migrate a file stored in the disk medium 210 to the tape medium 220 at a predetermined timing. After migrating the file to the tape medium 220, the storage management module 330 may place a file called "stub file" in the disk medium 210. The stub file has much less volume, and merely has stub information, as one example of storage location information, indicating a storage location of the migrated file on the tape medium 220. In FIG. 1, the file "FileY" is migrated to the tape medium 220 as indicated by an arrow. Then, the stub file corresponding to the file "FileY" is placed in the disk medium 210. After that, when the stub file is accessed, the storage management module 330 may recall the corresponding migrated file from the tape medium 220. The storage management module 330 may be, for example, the Linear Tape File System Enterprise Edition (LTFS EE).

The tape file system 340 is a software component which provides an interface for access to the tape media 220. The tape file system 340 may write a file to the tape medium 220 in response to a write request of the file from the storage management module 330. The tape file system 340 may return a file to the storage management module 330 in response to a read request of the file from the storage management module 330. The tape file system 340 may be, for example, the Linear Tape File System (LTFS). In particular, assuming that the tape media 220 are included in a tape library, the tape file system 340 may be, for example, the Linear Tape File System Library Edition (LTFS LE).

Figure 2:
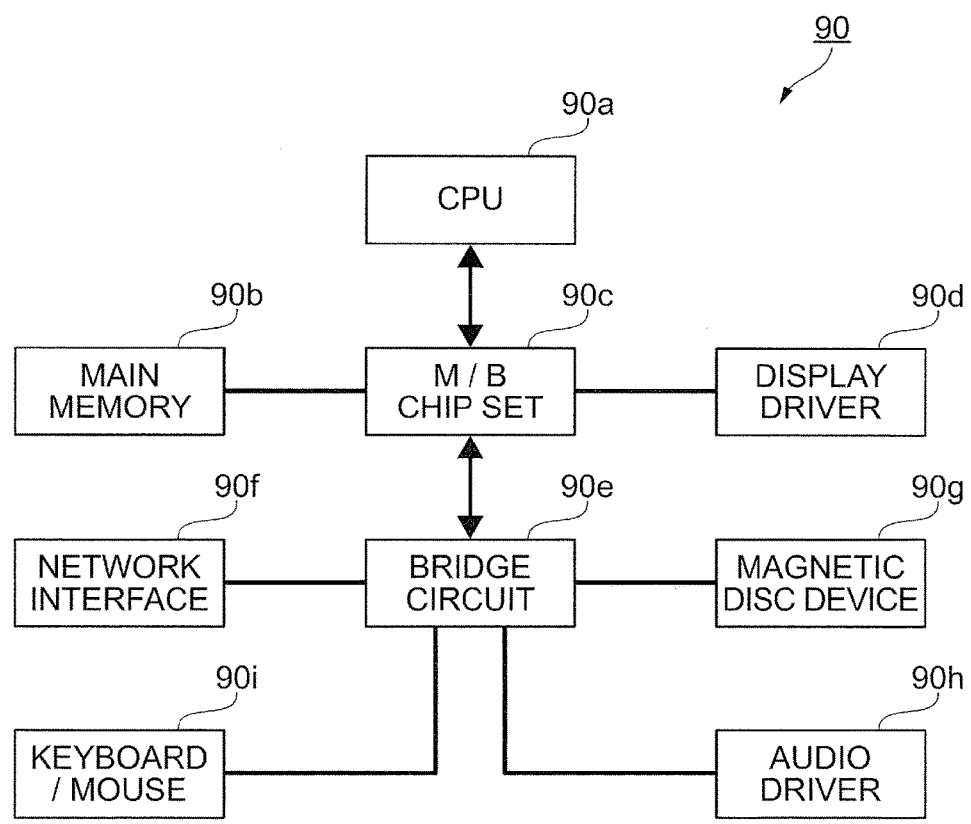
FIG. 2 depicts an example of a hardware configuration of a computer able to implement example embodiments of the present invention.

Referring to FIG. 2, there is shown an example of the hardware configuration of a computer 90 able to implement the exemplary embodiments. As shown in the figure, the computer 90 may include a central processing unit (CPU) 90a serving as one example of a processor, a main memory 90b connected to the CPU 90a via a motherboard (M/B) chip set 90c and serving as one example of a memory, and a display driver 90d connected to the CPU 90a via the same M/B chip set 90c. A network interface 90f, magnetic disk device 90g, audio driver 90h, and keyboard/mouse 90i are also connected to the M/B chip set 90c via a bridge circuit 90e.

In FIG. 2, the various configurational elements are connected via buses. For example, the CPU 90a and the M/B chip set 90c, and the M/B chip set 90c and the main memory 90b are connected via CPU buses, respectively. Also, the M/B chip set 90c and the display driver 90d may be connected via an accelerated graphics port (AGP). However, when the display driver 90d includes a PCI express-compatible video card, the M/B chip set 90c and the video card are connected via a PCI express (PCIe) bus. Also, when the network interface 90f is connected to the bridge circuit 90e, a PCI Express may be used for the connection, for example. For connecting the magnetic disk device 90g to the bridge circuit 90e, a serial AT attachment (ATA), a parallel-transmission ATA, or peripheral components interconnect (PCI) may be used. For connecting the keyboard/mouse 90i to the bridge circuit 90e, a universal serial bus (USB) may be used.

In the meantime, when the tape medium 220 is used as the secondary storage medium, in response to an access to the stub file in the disk medium 210, the migrated file on the tape medium 220 corresponding to the stub file may be recalled to the disk medium 210, as described above with reference to FIG. 1. However, the file remains undeleted on the tape medium 220 after having been recalled to the disk medium 210. When the file in the disk medium 210 is updated or deleted after having been recalled to the disk medium 210, the file remaining on the tape medium 220 becomes an old or unnecessary one. This is because the tape media 220 are append-only type storage media. As a result, even when the file is deleted in the tape file system 340, only metainformation of the file (information regarding a file name, a storage location of the file on the tape medium 220, or the like) is deleted while the file itself remains on the tape medium 220.

In the example embodiments, the file which has been deleted in the tape file system 340 is referred to as an "inactive file", and in contrast, the file which exists in the tape file system 340 and can be accessed via the stub file in the disk medium 210 is referred to as an "active file".

When the tape media 220 are used as the secondary storage media, the amount of inactive files gradually increases, which may cause decrease in efficiency of use of the tape media 220.

In view of this, the storage management module 330 may be provided with a reclamation function to perform a reclamation of the tape media 220. The reclamation function copies only active files from a source tape medium to a target tape medium in the tape media 220. By the reclamation function, the source tape medium is reclaimed. That is, in the example embodiments, the term "source tape medium" indicates a tape medium subject to a reclamation, and the term "target tape medium" indicates a tape medium to which active files are copied.

Figure 3:
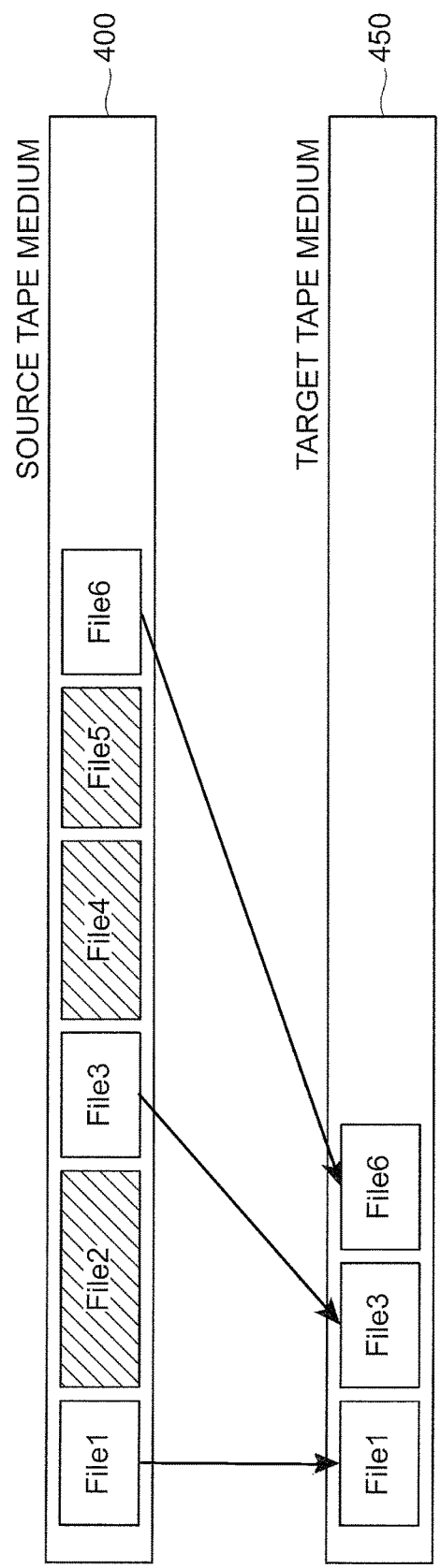
FIG. 3 depicts an example of a general reclamation.

Referring to FIG. 3, there is shown an example of a general reclamation by the reclamation function. In FIG. 3, the active files "File1", "File3" and "File6" with no hatching are copied from a source tape medium 400 to a target tape medium 450. After the active files have been copied in this manner, the source tape medium 400 is allowed to be reformatted to be reused.

Generally, to copy active files in the reclamation, the source tape medium is mounted on one tape drive, and simultaneously the target tape medium is mounted on another tape drive. That is, two tape drives are occupied for the reclamation, and thus fewer tape drives are available for migration and recall of files between the disk media 210 and the tape media 220. In view of this, to reduce an impact on migration and recall of files between the disk media 210 and the tape media 220, the storage management module 330 may execute the general reclamation, for example, only when the proportion of active files to all the files on the tape medium 220 is less than a predetermined proportion.

The general reclamation shown in FIG. 3 operates on a per-medium basis. For example, when many active files are present near the beginning of the tape medium 220 while many inactive files are present near the end of the files on the tape medium 220, the storage management module 330 may determine that the proportion of the active files to all the files on the tape medium 220 is not less than the predetermined proportion. As a result, the storage management module 330 may execute no reclamation.

For example, in an embodiment, the storage management module 330 handles a tape medium having a capacity of one terabyte, and is designed to execute a reclamation if inactive files exceed 80 percent of all the files on the tape medium. In this situation, inactive files that are present in the rear part of the tape medium may account for 700 gigabytes among one terabyte having been written on the tape medium. In this case, copying active files to another tape medium by the reclamation function might provide a free space of 700 gigabytes (i.e., a free space of 70 percent of a capacity of the tape medium). However, the storage management module 330 executes no reclamation, because the proportion of the inactive files is less than 80 percent of all the files, which is a threshold for execution of the reclamation. This causes the tape medium to have only 30 percent of a capacity, for storing the active files therein.

The storage management module 330 might execute a reclamation if the threshold were set lower. In this case, however, some of the tape drives may be occupied until completion of the reclamation. When the occupation time of the tape drives for the reclamation is prolonged, the number of the tape drives available for migration and recall of files between the disk media 210 and the tape media 220 may become insufficient.

In view of this, in the example embodiments, the storage management module 330 determines whether or not to execute the reclamation, on the basis of characteristics of files written in the rear part of the tape medium, such as an absolute amount, a relative amount or the like of active files.

Specifically, the storage management module 330 may copy all active files in an area near an end-of-data (EOD) marker, from the tape medium to another tape medium. Then, the storage management module 330 may permit the area to be overwritten if the area includes any inactive files. By performing this type of the reclamation, the tape medium is caused to be effectively utilized in a short time in comparison with the case where the storage management module 330 performs the general reclamation for the entire tape medium. Note that, in the example embodiments, this type of the reclamation is referred to as a "partial reclamation".

Figure 4:
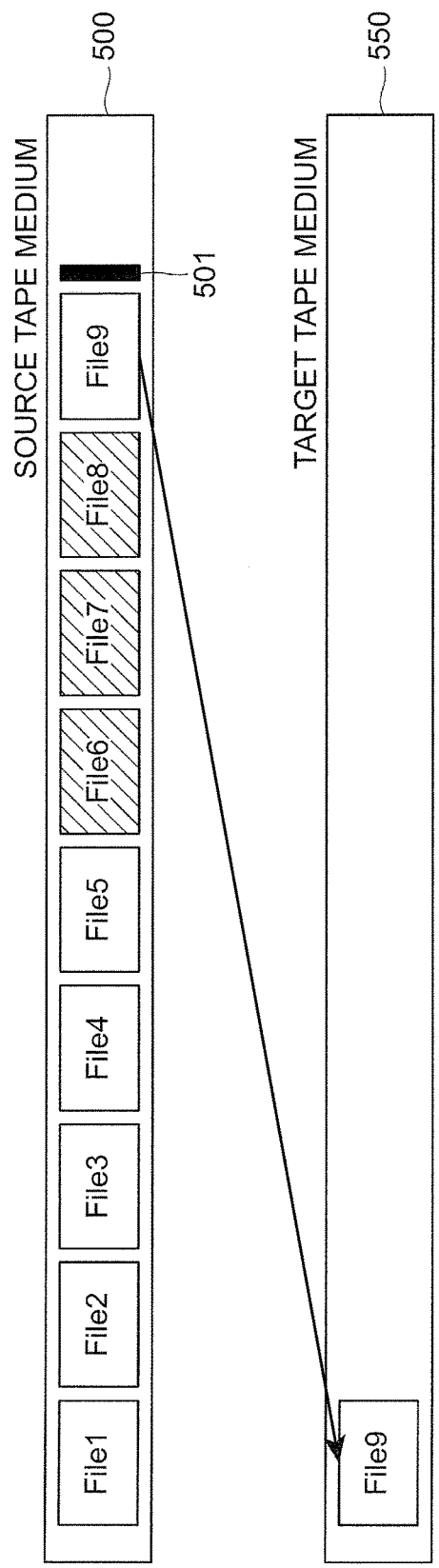
FIG. 4 depicts an example of a copy operation in a partial reclamation.

Referring to FIG. 4, there is shown a diagram illustrating an example of a copy operation in the partial reclamation. As shown in FIG. 4, the storage management module 330 first designates a source tape medium 500 as one example of a first sequential storage medium, and a target tape medium 550 as one example of a second sequential storage medium. In FIG. 4, the files "File1" to "File9" are stored, as one example of sequentially written data, in the source tape medium 500. These files include active files "File1" to "File5" and "File9" indicated by no hatching, and inactive files "File6" to "File8" indicated by hatching. Here, each of the files "File1" to "File9" serves as one example of a data block, and the active files "File1" to "File5" and "File9" serve as one example of active data blocks. An EOD marker 501 is further stored to be immediately posterior to the file "File9" in the source tape medium 500. In FIG. 4, it is assumed that inactive files "File6" to "File8" are recorded near the EOD marker 501 on the source tape medium 500. In this case, the storage management module 330 copies only the active file "File9" to the target tape medium 550.

Figure 5:
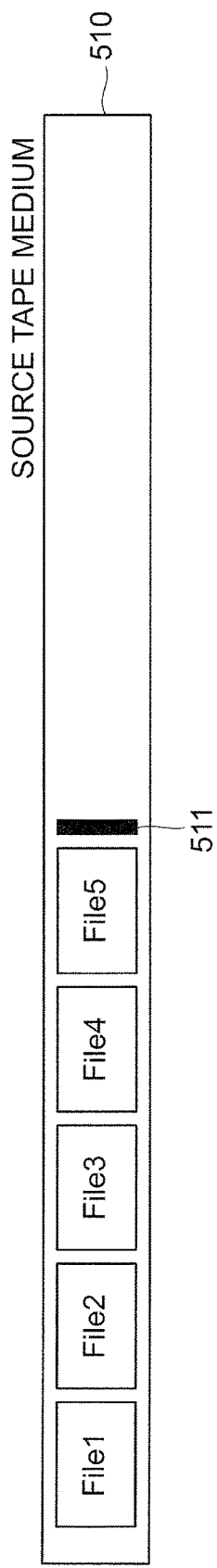
FIG. 5 depicts an example of a source tape medium after the copy operation in the partial reclamation.

Referring to FIG. 5, there is shown a diagram illustrating an example of a source tape medium 510, which is the source tape medium 500 after the copy operation in the partial reclamation. As shown in FIG. 5, the storage management module 330 writes a new EOD marker 511 in a position immediately posterior to the active file "File5". By writing the new EOD marker 511, the active files "File1" to "File5" are kept to be stored, as one example of new sequentially written data in the source tape medium 510, and an area posterior to the last active file "File5" on the source tape medium 510 may be effectively utilized.

Note that, FIGS. 4 and 5 illustrate merely examples of sequences of active files and inactive files, and the sequences are not limited thereto. The files "File1" to "File5" may include at least one inactive file. At least one file, though not depicted in the figure, may exist between the file "File9" and the EOD marker 501 on the source tape medium 500. The file "File9" may be divided into multiple files including at least one inactive file. For example, the multiple files may include an active file "File9-1", an inactive file "File9-2" and an active file "File9-3" in this order.

Figure 6:
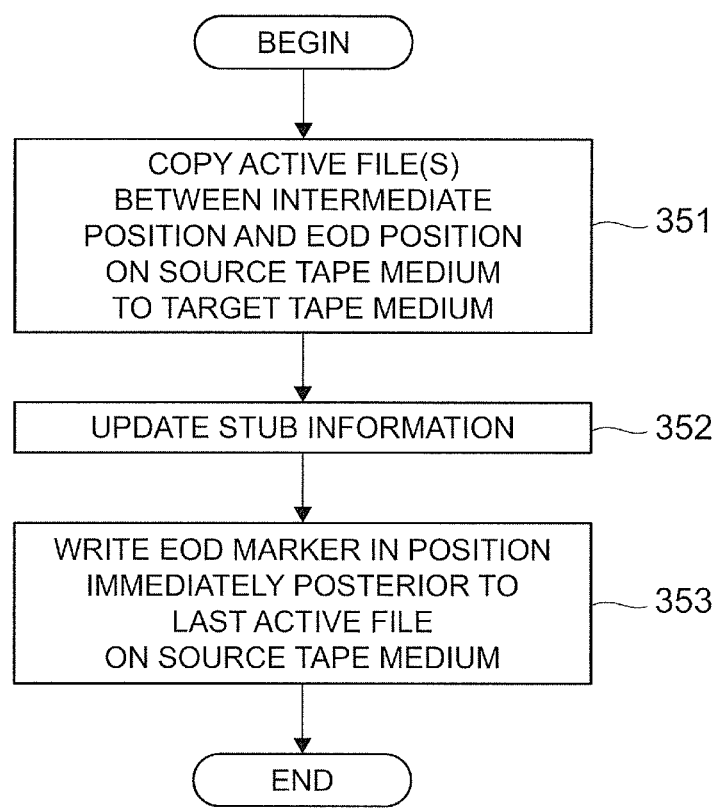
FIG. 6 depicts a flowchart representing an operation of the partial reclamation by a storage management module according to example embodiments of the present invention.

Referring to FIG. 6, there is shown a flowchart representing an example of the partial reclamation by the storage management module 330. The partial reclamation is assumed to be executed when a predetermined condition is satisfied. Also, it is assumed that the storage management module 330 manages whether each file on the tape media 220 is active or inactive prior to the partial reclamation. By controlling migration and recall of files between the disk media 210 and the tape media 220, and monitoring update and deletion of the files recalled to the disk media 210, the storage management module 330 may manage whether each file on the tape media 220 is active or inactive.

As shown in the figure, the storage management module 330 may copy one or more active files between an intermediate position and a position at which an EOD marker is written (hereinafter referred to as an "EOD position") on a source tape medium, to a target tape medium (step 351). Next, the storage management module 330 may update the stub information in the disk medium 210 indicating the storage locations of the one or more active files copied to the target tape medium (step 352). Specifically, the storage management module 330 may change the stub information from indicating a storage location on the source tape medium to indicating a storage location on the target tape medium to update the stub information. After that, the storage management module 330 may write an EOD marker in the position immediately posterior to the last active file on the source tape medium (step 353). By the partial reclamation as described above, the source tape medium may be allowed to be overwritten for reuse, from the position immediately posterior to the last active file.

Although timing for executing the partial reclamation shown in FIG. 4 is not mentioned, the partial reclamation may be executed when the amount of inactive files near the EOD marker is large.

Figure 7:
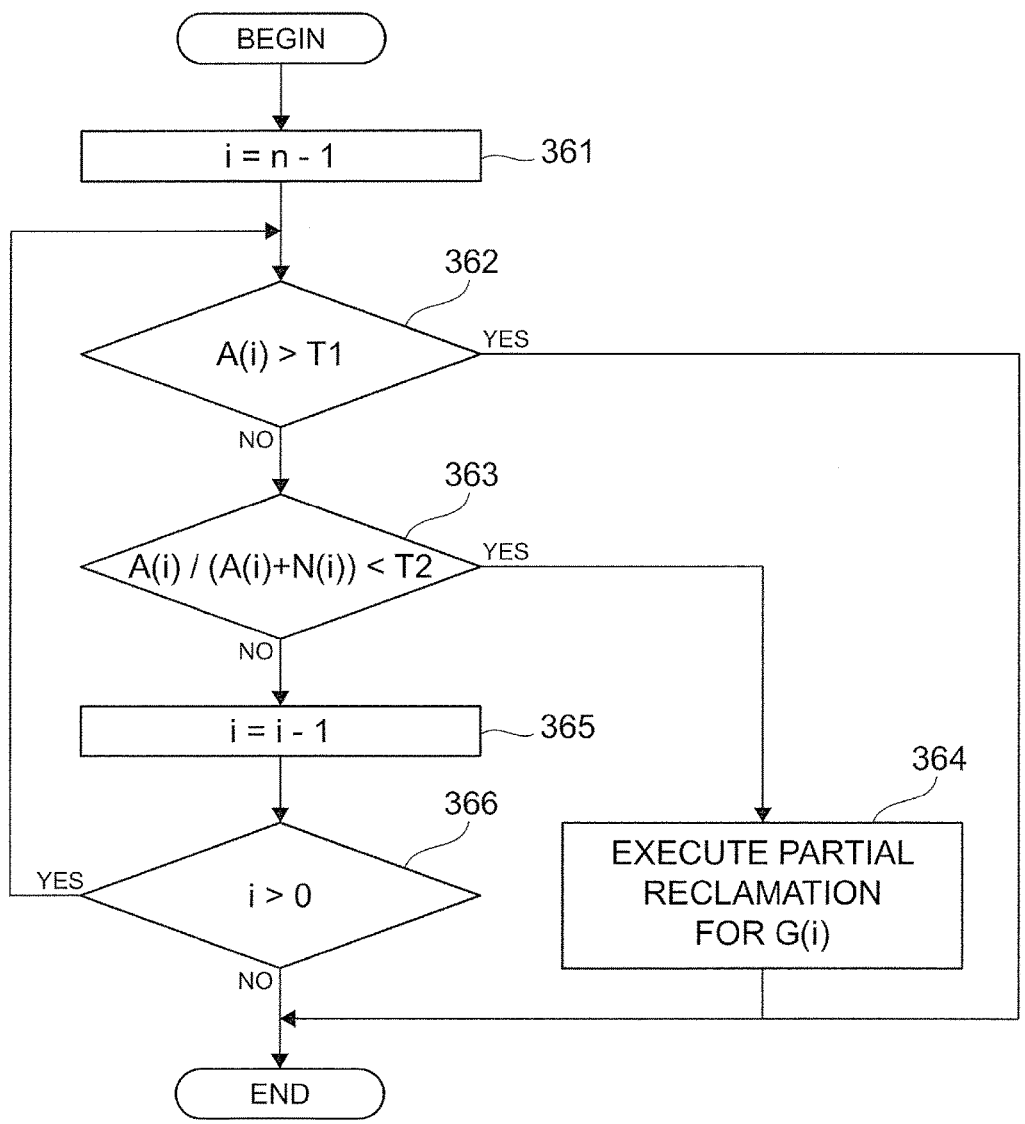
FIG. 7 depicts a flowchart representing an operation of determination of the timing of the partial reclamation by a storage management module according to example embodiments of the present invention.

Referring to FIG. 7, there is shown a flowchart representing an example of determination, by the storage management module 330, of when the partial reclamation is to be executed. In FIG. 7, it is assumed that n files, i.e., "File1", "File2", . . . , "File n" are stored on the source tape medium (herein, n represents the number not less than two). Also, it is assumed that G(i) represents a set of files ("File1", "File2", . . . , "File n"), that A(i) represents the amount of active files in G(i), and that N(i) represents the amount of inactive files in G(i). Further it is assumed that T1 represents the first threshold for ensuring that no partial reclamation is executed when the amount of the active files is large, and that T2 represents the second threshold for executing the partial reclamation when the proportion of the inactive files to all the files on the tape medium is large.

First, the storage management module 330 may set a variable i for counting files to n−1 (step 361). Next, the storage management module 330 may determine whether or not A(i) is greater than T1 (step 362). If A(i) is greater than T1, the process may go to the end. That is, the storage management module 330 may execute no partial reclamation. This is because copying a large amount of active files causes the occupation time of the tape drives to be longer.

If, at step 362, A(i) is not greater than T1, the storage management module 330 may determine whether or not (A(i)/(A(i)+N(i))) is less than T2 (step 363). If (A(i)/(A(i)+N(i))) is less than T2, the storage management module 330 may execute the partial reclamation for G(i) (step 364). That is, the storage management module 330 may call the processing of FIG. 6, using G(i) as a parameter.

If, at step 363, (A(i)/(A(i)+N(i))) is not less than T2, the storage management module 330 may subtract 1 from the variable i (step 365), and may determine whether or not the variable i is greater than zero (step 366). If the variable i is greater than zero, the process returns to step 362. If, at step 366, the variable i is not greater than zero, the process may go to the end.

Note that the flowcharts of FIGS. 6 and 7 represent a schematic operation of the partial reclamation of FIGS. 4 and 5, assuming that the number of files n is set to 9.

In addition, assume that the determination result at step 363 of FIG. 7 is "YES" in a loop in which the variable i is set to 8. This corresponds to the case in which the storage management module 330 specifies the file "File9", as the active file to be copied, from the files "File8" and "File9". In this case, a position in which the file "File8" has been written is one example of a first intermediate position, and a part in which the files "File8" and "File9" have been written is one example of a first part of sequentially written data.

Alternatively, assume that the determination result at step 363 of FIG. 7 is "YES" in a loop in which the variable i is set to 7. This corresponds to the case in which the storage management module 330 specifies the file "File9", as the active file to be copied, from the files "File7" to "File9". In this case, a position in which the file "File7" has been written is one example of a first intermediate position, and a part in which the files "File7" to "File9" have been written is one example of a first part of sequentially written data.

Alternatively, assume that the determination result at step 363 of FIG. 7 is "YES" in a loop in which the variable i is set to 6. This corresponds to the case in which the storage management module 330 specifies the file "File9", as the active file to be copied, from the files "File6" to "File9". In this case, a position in which the file "File6" has been written is one example of a first intermediate position, and a part in which the files "File6" to "File9" have been written is one example of a first part of sequentially written data.

Regardless of whether the determination result at step 363 of FIG. 7 is "YES", in any loop in which the variable i is set to 6, 7 or 8, the storage management module 330 writes an EOD marker in a position posterior to the last active file "File5", at step 353 of FIG. 6. In this case, the position posterior to the file "File5" is one example of a second intermediate position, and a part in which the files "File1" to "File5" have been written is one example of a second part of sequentially written data. However, the storage management module 330 may write the EOD marker anywhere in a part which is posterior to the file "File5" and excludes the file "File9".

In the foregoing explanation, the storage management module 330 executes the partial reclamation only once when the predetermined condition is satisfied. However, the storage management module 330 may execute the partial reclamation repeatedly when the predetermined condition is satisfied. This is an alternative embodiment of the present invention. In this alternative embodiment, the storage management module 330 may execute the partial reclamation for the files "File1" to "File5", in the same manner as the reclamation for the files "File1" to "File9". If a rear part of the files "File1" to "File5" includes any inactive file, the storage management module 330 may provide a free space by executing the partial reclamation again.

In the exemplary embodiments stated above, the storage management module 330 copies active files only in an area near the EOD marker on the source tape medium to the target tape medium, and allows the area further including inactive files to be overwritable. This can shorten the time required for the reclamation to increase a free space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reclaiming a sequential storage medium, the method comprising:
   determining that a position in sequentially written data on a first sequential storage medium is a first intermediate position, the determining based on: (i) an amount of active data blocks between the position and an end of the sequentially written data being less than a first threshold, and (ii) a ratio of the amount of active data blocks to an amount of total data blocks between the position and the end of the sequentially written data being less than a second threshold;
   copying all active data blocks in a first part of the sequentially written data on the first sequential storage medium, to a second sequential storage medium, the first part extending from the first intermediate position to the end of the sequentially written data; and
   defining all data blocks in a second part of the sequentially written data on the first sequential storage medium, to be a new sequentially written data, the second part extending from a beginning of the sequentially written data to a second intermediate position of the sequentially written data, and excluding the active data blocks copied to the second sequential storage medium.

2. The method of claim 1, further comprising changing storage location information of the active data blocks from indicating the first sequential storage medium to indicating the second sequential storage medium.

3. The method of claim 2, further comprising:
   storing a data block in a high-speed storage medium accessible at a speed higher than the sequential storage medium;
   migrating the data block to the first sequential storage medium under a predetermined condition; and
   placing, in the high-speed storage medium, the storage location information of the data block, the storage location information indicating the first sequential storage medium.

4. The method of claim 1, wherein
   the end of the sequentially written data is a position at which an end-of-data (EOD) marker is written; and
   the defining comprises writing a new EOD marker at a position immediately posterior to the second part.

5. The method of claim 1, wherein the copying and the defining are repeated using the new sequentially written data in place of the sequentially written data.

6. A computer program product for reclaiming a sequential storage medium, the computer program product comprising a computer readable storage medium having program instructions embodied therewith, the program instructions executable by a computer to cause the computer to:
   determine that a position in sequentially written data on a first sequential storage medium is a first intermediate position, the determining based on: (i) an amount of active data blocks between the position and an end of the sequentially written data being less than a first threshold, and (ii) a ratio of the amount of active data blocks to an amount of total data blocks between the position and the end of the sequentially written data being less than a second threshold;
   copy all active data blocks in a first part of the sequentially written data on the first sequential storage medium, to a second sequential storage medium, the first part extending from the first intermediate position to the end of the sequentially written data; and
   define all data blocks in a second part of the sequentially written data on the first sequential storage medium, to be a new sequentially written data, the second part extending from a beginning of the sequentially written data to a second intermediate position of the sequentially written data, and excluding the active data blocks copied to the second sequential storage medium.

7. The computer program product of claim 6, wherein the program instructions are further executable by the computer to cause the computer to change storage location information of the active data blocks from indicating the first sequential storage medium to indicating the second sequential storage medium.

8. The computer program product of claim 7, wherein the program instructions are further executable by the computer to cause the computer to:
   store a data block in a high-speed storage medium accessible at a speed higher than the sequential storage medium;
   migrate the data block to the first sequential storage medium under a predetermined condition; and
   place, in the high-speed storage medium, the storage location information of the data block, the storage location information indicating the first sequential storage medium.

9. The computer program product of claim 6, wherein
   the end of the sequentially written data is a position at which an end-of-data (EOD) marker is written; and
   the defining comprises writing a new EOD marker at a position immediately posterior to the second part.

10. The computer program product of claim 6, wherein the copying and the defining are repeated using the new sequentially written data in place of the sequentially written data.

11. A computer system for reclaiming a sequential storage medium, the computer system comprising:
   a processor(s) set; and
   a memory coupled to the processor set;
   wherein the memory comprises program instructions which are executable by the processor set to cause the processor set to:
      determine that a position in sequentially written data on a first sequential storage medium is a first intermediate position, the determining based on: (i) an amount of active data blocks between the position and an end of the sequentially written data being less than a first threshold, and (ii) a ratio of the amount of active data blocks to an amount of total data blocks between the position and the end of the sequentially written data being less than a second threshold;
      copy all active data blocks in a first part of the sequentially written data on the first sequential storage medium, to a second sequential storage medium, the first part extending from the first intermediate position to the end of the sequentially written data; and
      define all data blocks in a second part of the sequentially written data on the first sequential storage medium, to be a new sequentially written data, the second part extending from a beginning of the sequentially written data to a second intermediate position of the sequentially written data, and excluding the active data blocks copied to the second sequential storage medium.

12. The computer system of claim 11, wherein the program instructions are further executable by the processor set to cause the processor set to change storage location information of the active data blocks from indicating the first sequential storage medium to indicating the second sequential storage medium.

13. The computer system of claim 12, wherein the program instructions are further executable by the processor set to cause the processor set to:
   store a data block in a high-speed storage medium accessible at a speed higher than the sequential storage medium;
   migrate the data block to the first sequential storage medium under a predetermined condition; and
   place, in the high-speed storage medium, the storage location information of the data block, the storage location information indicating the first sequential storage medium.

14. The computer system of claim 11, wherein
   the end of the sequentially written data is a position at which an end-of-data (EOD) marker is written; and
   the defining comprises writing a new EOD marker at a position immediately posterior to the second part.

15. The computer system of claim 11, wherein the copying and the defining are repeated using the new sequentially written data in place of the sequentially written data.

* * * * *